(12) United States Patent
Hilligoss

(10) Patent No.: US 6,280,551 B1
(45) Date of Patent: Aug. 28, 2001

(54) METHOD AND SYSTEM FOR PRODUCING A 3-D DEEP-DRAWN ARTICLE USING A THERMOPLASTIC SANDWICH MATERIAL

(75) Inventor: Lloyd R. Hilligoss, South Lyon, MI (US)

(73) Assignee: Patent Holding Company

( * ) Notice: Subject to any disclaimer, the term of this patent is extended or adjusted under 35 U.S.C. 154(b) by 0 days.

(21) Appl. No.: 09/580,070

(22) Filed: May 30, 2000

(51) Int. Cl.$^7$ .................................................. B29C 51/00
(52) U.S. Cl. .................. 156/201; 156/196; 156/199; 156/204; 156/285; 428/304.4; 264/545; 264/297.4; 296/212
(58) Field of Search .................. 493/52, 56, 57, 493/58, 59, 60–64, 67, 69, 70, 68, 74, 75, 310, 313, 343, 353–356, 906, 966, 83, 84, 89, 82, 80, 76–79, 907–908, 94–96, 100–101, 110, 136, 160, 162, 177–178, 183, 185, 397, 399, 405, 418; 156/196–197, 199–202, 204, 209, 217, 219, 227, 269, 271, 313; 428/116–118, 304.4; 264/297.4, 545

(56) References Cited

U.S. PATENT DOCUMENTS 5,789,057 * 8/1998 Naitou et al. ........................... 428/73
5,840,397 * 11/1998 Landi et al. ............................ 428/73

* cited by examiner

Primary Examiner—Michael W. Ball
Assistant Examiner—Jessica Rossi
(74) Attorney, Agent, or Firm—Welsh & Katz, Ltd.

(57) ABSTRACT

A method and system for producing an article using a thermoplastic sandwich material such as, for example, a 3-D deep-drawn article is disclosed. In accordance with an aspect of the present invention, two reinforced thermoplastic skins surround a generally planar honeycomb structure. During the manufacturing process, the skins and the honeycomb structure are bonded together by means of a thermocoupling process.

11 Claims, 3 Drawing Sheets

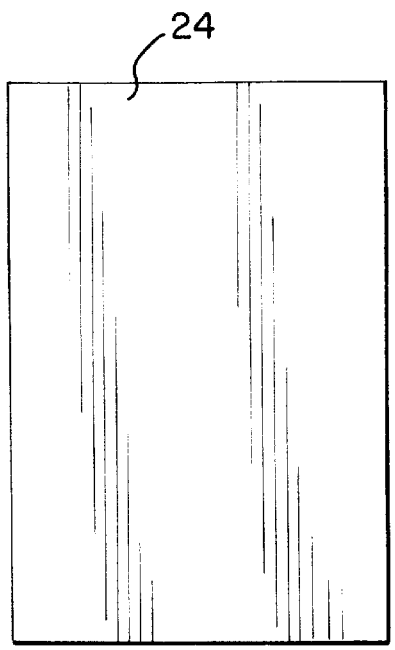
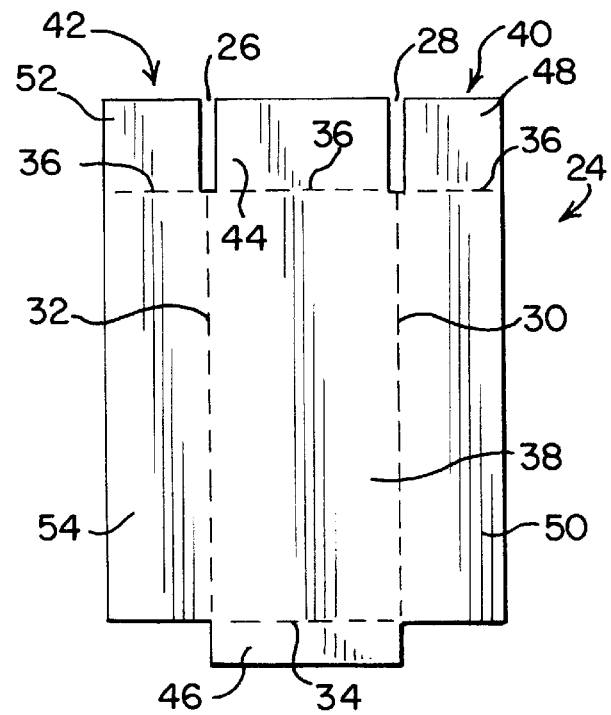
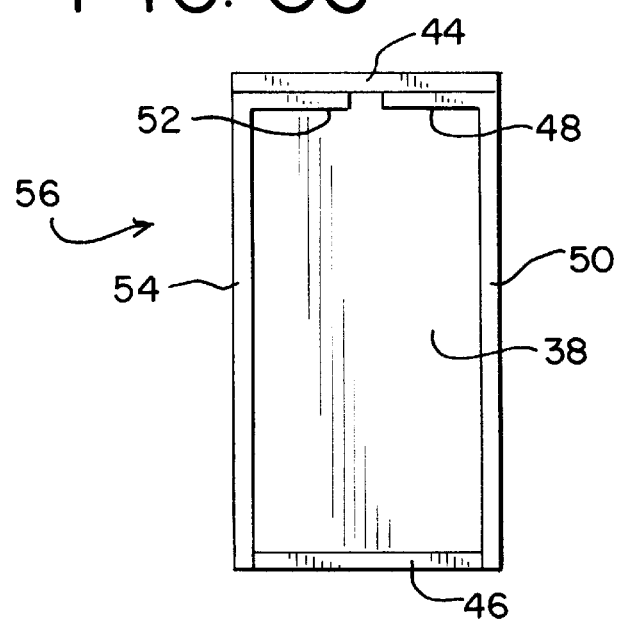

METHOD AND SYSTEM FOR PRODUCING A 3-D DEEP-DRAWN ARTICLE USING A THERMOPLASTIC SANDWICH MATERIAL

FIELD OF THE INVENTION

The present invention generally relates to thermoplastic sandwich materials and, more particularly, to a method and system for producing a 3-D deep-drawn article using a thermoplastic sandwich material.

BACKGROUND OF THE INVENTION

A process for producing a thermoplastic sandwich material that includes a honeycomb structure is disclosed in U.S. Pat. No. 5,683,782. Referring to FIG. 1 of U.S. Pat. No. 5,683,782, a greatly enlarged sectional representation of a honeycomb segment with a cover layer is shown. In accordance with the invention disclosed in this patent, a thermoplastic sandwich material is made from two outer reinforced thermoplastic skins with a cellular core at the center that is molded by a thermocompression process. The skins are formed from polypropylene with continuous glass mats or are formed by woven glass with polypropylene fibers. The content of U.S. Pat. No. 5,683,782 is incorporated by reference into this application as if fully set forth herein.

Thermoplastic sandwich materials such as those disclosed in U.S. Pat. No. 5,683,782 have been utilized in a variety of different applications. For example, U.S. patent application Ser. No. 09/451,970, filed Nov. 30, 1999 discloses a method for molding an impact resistant automotive part such as a bumper beam. A thermoplastic reinforced fiber structure at least partially forms a pair of attachment portions of the automotive part and continuously extends between the attachment portions to link the attachment portions. The content of the Ser. No. 09/451,970 patent application is incorporated by reference into this application as if fully set forth herein.

In another example, U.S. patent application Ser. No. 09/445,356, filed Dec. 10, 1999 discloses a method of making a composite panel that has a sandwich structure and that is provided with a hinge. The panel comprises a stack that includes at least one first skin of a reinforced thermoplastic material and a second skin of a thermoplastic material. The panel is formed by preheating the first and second skins to a softening temperature, and then pressing the stack of skins at a pressure that lies in a predetermined range. The content of the Ser. No. 09/445,356 patent application is incorporated by referenced into this application as if fully set forth herein.

Yet another exemplary use of thermoplastic sandwich material is disclosed in U.S. patent application Ser. No. 09/485,142, filed Feb. 4, 2000. This application discloses a method of making a reinforced composite panel of the sandwich type having a cellular-core. The content of the Ser. No. 09/485,142 application is incorporated by reference into this application as if fully set forth herein.

U.S. patent application Ser. No. 09/525,346, filed Mar. 15, 2000 discloses the utilization of thermoplastic sandwich material in a certain application. In particular, this application discloses a method and system for co-molding a thermoplastic material with a thermoplastic sandwich material to form a thermoplastic sandwich article. The article has a thermoplastic inner portion. The content of Ser. No. 09/525,346 patent application is incorporated by reference into this application as if fully set forth herein.

U.S. patent application Ser. No. 09/525,785 entitled "Method and System For Molding Thermoplastic Sandwich Material and Deep-Drawn Article Produced Thereby," filed Mar. 15, 2000 discloses a method and system for molding a thermoplastic sandwich material to form a deep-drawn article. In particular, an inner portion of a blank of thermoplastic sandwich material is forced into a female die along a vertical axis to form a deep-drawn article. A step of clamping may be performed at a plurality of spaced outer portions of the blank immediately adjacent the female die. The content of the above-referenced "Method and System" patent application is incorporated by reference into this application as if fully set forth herein.

In use of such processes to form 3-D deep-drawn articles from a thermoplastic sandwich material, sometimes visual defects such as puckering, wrinkling, and the like may occur in the finished article, especially at the corner areas of the article. Visual defects of this sort may render the article visually unacceptable for commercial purposes.

In some applications, carpet has been utilized as a surface finish to render the article usable for commercial purposes. However, carpet is not suitable for use as an exterior finish in every application. Furthermore, in an application where an article is deep-drawn to a relatively large size such as over 18 inches, prior processes for forming thermoplastic sandwich materials may not allow "Class A" surfaces to be defined on the article that are visually acceptable for commercial purposes.

SUMMARY OF THE INVENTION

It is desirable to provide an improved method and system for producing articles from a thermoplastic sandwich material such as, for example, a 3-D deep-drawn article in which the exterior surface of the article has a "Class A" surface. According to an aspect of the present invention, such articles include a generally planar layer of a honeycomb material that is sandwiched between two thermoplastic skins. The portions of the article that extend away from the generally planar layer of honeycomb material are formed only from the two thermoplastic skins, not the honeycomb material.

Providing such a method and system has a number of distinct advantages. For example, forming the third dimensional aspect of an article generally only from thermoplastic skin material allows articles having relatively large deep-draws to be manufactured with a minimum of visual defects. In some applications, according to an aspect of the invention, articles with a deep-draw on the order of well beyond forty-eight inches can be made. Furthermore, in an exemplary automotive application of the present invention where the article to be formed is a truck box, the costs of manufacturing the truck box are significantly reduced because, for example, the labor costs associated with the application of a plastic liner to the metal truck box are totally eliminated.

Other features and advantages of the invention will become apparent from the description that follows.

DESCRIPTION OF THE DRAWINGS

FIG. 3A is a plan view of a sheet of thermoplastic material;

FIG. 3B is a plan view of the thermoplastic sheet shown in FIG. 3A that has been die-cut to form a number of slits and fold lines;

FIG. 3C is a plan view of the die-cut thermoplastic sheet shown in FIG. 3B that has been folded along the fold lines shown in FIG. 3B.

DETAILED DESCRIPTION OF THE INVENTION

Figure 1:
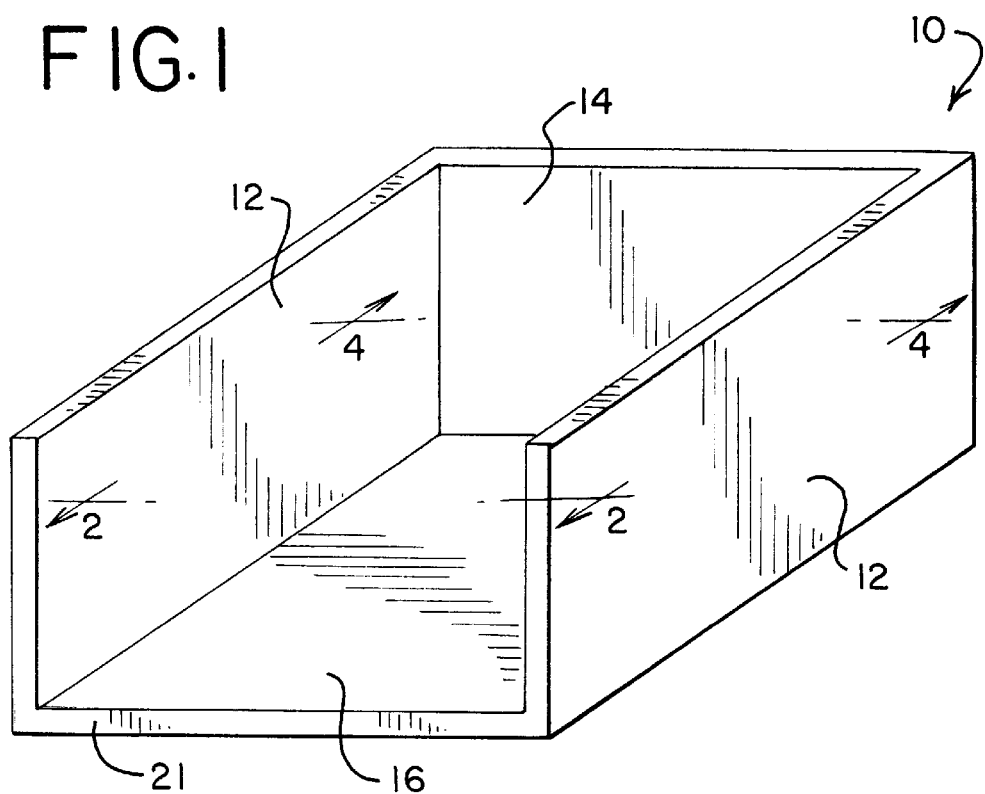
FIG. 1 is a perspective view of an exemplary 3-D deep-drawn article that is formed from a thermoplastic sandwich material and that is manufactured in accordance with a number of aspects of the present invention.

Referring to FIG. 1, a perspective view of an exemplary 3-D deep-drawn article 10 that is formed from a thermoplastic sandwich material in accordance with a number of aspects of the present invention is shown. In the illustrated embodiment of the present invention, 3-D deep-drawn article 10 forms a truck box that is utilized in conventional pick-up trucks in place of a standard metal box that typically is used in conjunction with a plastic liner. Manufacturing truck boxes from a thermoplastic sandwich material in accordance with a number of aspects of the present invention provides for significant cost savings for a number of reasons. For example, the labor costs associated with the application of a plastic liner to a conventional metal truck box are totally eliminated by the utilization of the present invention.

It should be appreciated by those of ordinary skill in the relevant art that article 10 can be any article that is formed, for example, in a deep-drawn manner. In a number of exemplary automotive applications of the present invention other than that discussed above, article 10 is a low cost floor panel, a removable hard top, a fixed hard top, or the like. It also should be appreciated that the present invention is suitable for use in non-automotive applications to manufacture articles such as 3-D deep-drawn parts. Examples of such articles include, but are not limited to, counter tops, cubical dividers, low cost headliners, or the like.

Figure 2:
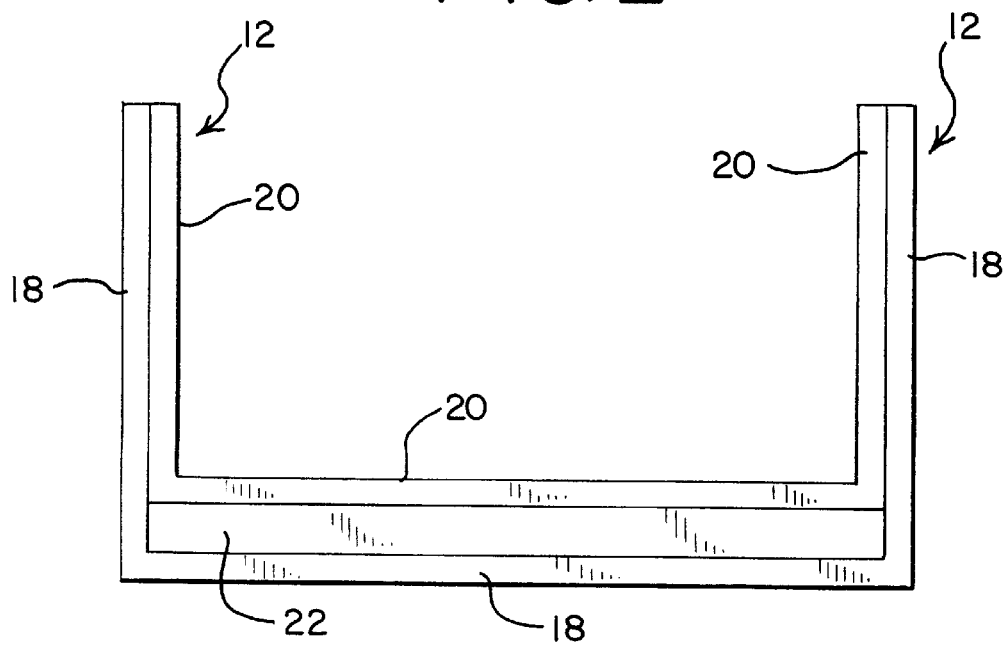
FIG. 2 is a sectional view of the 3-D deep-drawn article shown in FIG. 1 taken along lines 2—2.

Referring to FIGS. 1 and 2, truck box 10 includes two side walls 12, a front wall 14, and a bottom wall 16. In the illustrated embodiment of the present invention, side walls 12, front wall 14, and bottom wall 16 are formed from first and second reinforced thermoplastic skins 18 and 20 as shown in FIG. 2. Bottom wall 16 includes a layer of honeycomb material 22 that is sandwiched between thermoplastic skins 18 and 20. Reference is made to U.S. Pat. No. 5,683,782 that is incorporated by reference into this application as noted above for a complete discussion of the construction of the honeycomb material 22.

In the illustrated embodiment of the present invention, front wall 14 is located adjacent to the cab of a pickup truck when truck box 10 is mounted on a pick-up truck. A rear wall surface 21 is formed by juxtaposed portions of skins 18 and 20 at a distal end of side walls 12 and a distal end of bottom wall 16 at a location opposite front wall 14. Rear wall surface 21 covers a distal end of the honeycomb structure 22.

A plan view of a sheet of thermoplastic material 24 is shown in FIG. 3A. Two of such sheets 24 are utilized to form the thermoplastic skins 18 and 20. Referring to FIG. 3B, in order to make the thermoplastic sheet 24 into the box shape shown in FIG. 1, two slits 26, 28 as well as fold lines 30, 32, 34, and 36 are formed in the thermoplastic sheet 24 by, for example, a die-cutting process. A conventional folding station is utilized to fold the die-cut sheet 24 into the folded form 56 shown in FIG. 3C.

Referring to FIG. 3B, fold lines 30-36 define a bottom portion 38 in sheet 24. Bottom portion 38 forms a part of the bottom wall 16 of truck box 10 (FIG. 1).

Fold line 30 and slit 28 define a side foldable portion 40. Similarly, fold line 32 and slit 26 form a side foldable portion 42. Fold line 36 defines first and second portions 48 and 50 as well as 52 and 54 in the side foldable portions 40 and 42, respectively. The side foldable portions 40 and 42 are folded by the folding station as shown in FIG. 3C so that the second portions 50 and 54 form a portion of the sidewalls 12 of truck box 10 (FIG. 1).

Fold line 36 and slits 26, 28 define a front foldable portion 44. The front foldable portion 44 and the first portions 48 and 52 of side foldable portions 40 and 42, respectively, are folded by the folding station as shown in FIG. 3C to form the front wall 14 of truck box 10 (FIG. 1). It should be appreciated that, in accordance with a further aspect of the present invention, side foldable portions 40 and 42 are folded by the folding station so that an inner surface of portions 48 and 52 are in contact with an outer surface of portion 44. It also should be appreciated that complex shapes such as, for example, wheel wells can be formed in skins 18 and 20 when the skins are manufactured by, for example, a die-cutting operation.

Fold line 34 defines a rear foldable portion 46 in sheet 24. Rear foldable portion 46 is folded in the manner shown in FIG. 3C by the folding station to form a rear end surface 21 of the truck box 10 (FIG. 1).

Figure 4:
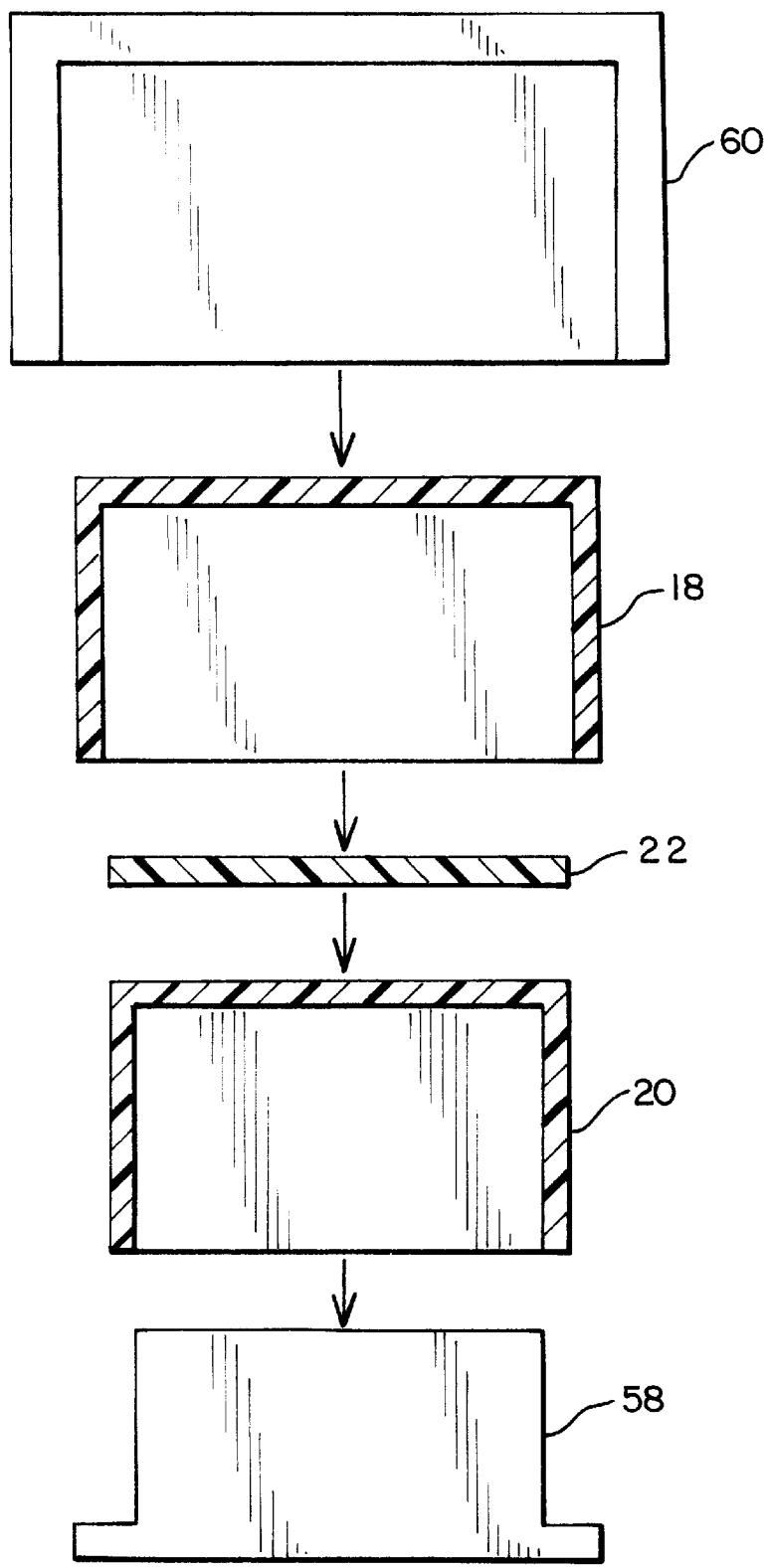
FIG. 4 is an exploded view of a section of the 3-D deep-drawn article shown in FIG. 1 taken along lines 4—4, wherein the article is shown in a partially manufactured state and positioned to be surrounded by two mold halves.

Referring to FIG. 4, an exploded view of a section of the 3-D article shown in FIG. 1 taken along lines 4—4, wherein the truck box 10 is shown in a partially manufactured state. In accordance with one embodiment of the present invention, mold halves 58 and 60 form first and second mold halves of a typical compression mold that are movable relative to each other. In this example, skins 18 and 20 are formed by placing two folded forms 56 (FIG. 3C) on vacuum preforms that hold the portions 44, 48, and 52 of each folded form 56 together. The vacuum preform and folded form 56 are heated to a softening temperature to caused portions 44, 48, and 52 to be bonded together.

In some applications, it is desirable to provide texture on the exterior surface of an article that is produced in accordance with this aspect of the present invention. In this case, folded forms 56 are subject to a known texturizing process.

After skins 18 and 20 are formed, then a stack is made as shown in FIG. 4 relative to mold halves 58 and 60. Mold halves 58 and 60 are then pressed together to seal the truck box 10 by a known thermocompression process. After the molding process is completed, truck box 10 is removed from the mold and any flash thereon truck box 10 is removed.

In accordance with a second embodiment of the present invention, first and second mold halves 58 and 60 form first and second mold halves of a typical vacuum compression mold that are movable relative to each other. In accordance with this aspect of the present invention, first and second folded forms 56 (FIG. 3C) are placed in the first and second mold halves 58 and 60. The vacuum provided in each mold half 58 and 60 holds the portions 44, 48, and 52 of each folded form together.

In some applications, it is desirable to provide texture on the exterior surface of an article that is manufactured in accordance with this aspect of the present invention. In this case, mold halves 58 and 60 form textured vacuum compression mold halves, and a relatively high vacuum is used during the molding process to provide the desired texture.

Thereafter, a layer of honeycomb material 22 is stacked on top of the folded form 56 on mold half 58 that is shown as skin 20 in FIG. 4. Then, the first and second mold halves 58 and 60 are closed, and the stack is pressed to subject the stack to a predetermined pressure that is sufficient to cause the skins 18 and 20 as well as the honeycomb material 22 to be bonded together. After the molding process is completed, truck box 10 is removed from the mold and any flash is removed.

While the invention has been illustrated and described in detail in the drawings and foregoing description, the same is considered as illustrative and not restrictive in character, it being understood that all changes and modification that come within the spirit of the invention are desired to be protected.

What is claimed is:

1. A method for forming a vehicle component part, comprising the steps of:
    providing a cellular core of thermoplastic material that has a generally planar shape;
    creating at least one fold line in a first and a second thermoplastic skin, said at least one fold line defining at least first and second portions of said first and second thermoplastic skins;
    forming a stack that includes said first thermoplastic skin, said cellular core, and said second thermoplastic skin, wherein said cellular core is sandwiched between the first portions of said first and second thermoplastic skins, and wherein the second portions of said first and second thermoplastic skins are adjacent to each other and are disposed at an angle with respect to said cellular core; and
    subjecting said stack to a thermocompression process so that said first portions of said first and second thermoplastic skins are bonded to said cellular core to form a generally planar member, and so that the second portions of said first and second thermoplastic skins are bonded together to form at least one wall portion that is disposed at an angle with respect to said generally planar member.

2. The method of claim 1 wherein said fold lines are created by a die-cutting process.

3. The method of claim 1 wherein said thermocompressed stack comprises a truck bed.

4. The method of claim 1 wherein said at least one wall portion is generally perpendicular to said generally planar member.

5. The method of claim 1 wherein said thermocompressed stack forms a vehicle component having an exterior surface at least a portion of which defines a Class "A" surface.

6. The method of claim 1 wherein said thermocompressed stack is deep-drawn.

7. The method of claim 1 wherein the deep-draw of said thermocompressed stack is at least forty eight inches.

8. The method of claim 1 wherein said subjecting step includes the step of inserting said stack in a vacuum compression mold.

9. The method of claim 8 wherein said subjecting step further includes the step of causing a relatively high vacuum to be placed on said stack to cause texture to be provided on exterior surfaces of said first and second skins.

10. The method of claim 1 wherein the second portions of said first and second thermoplastic skins form first, second and third wall portions all of which are generally perpendicular to said body portion and define a generally enclosed space with said body portion.

11. The method of claim 10 wherein said first and second wall portion are generally perpendicular to said third wall portion.

\* \* \* \* \*